March 26, 1963 J. C. P. GONDARD 3,082,963
HAMMER GRINDER
Filed May 2, 1961 5 Sheets-Sheet 5
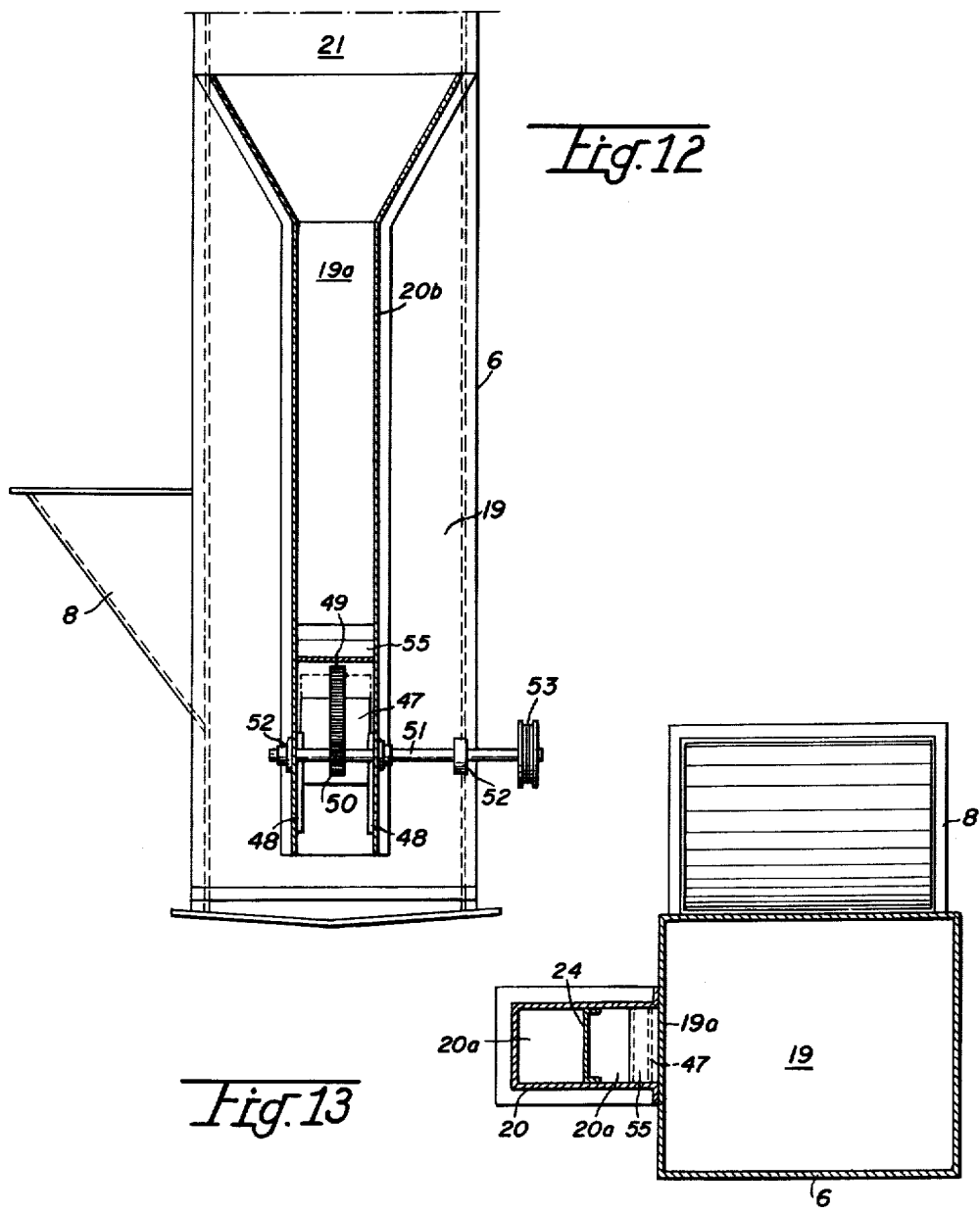
INVENTOR
JEAN CHARLES PIERRE GONDARD
ATTORNEY

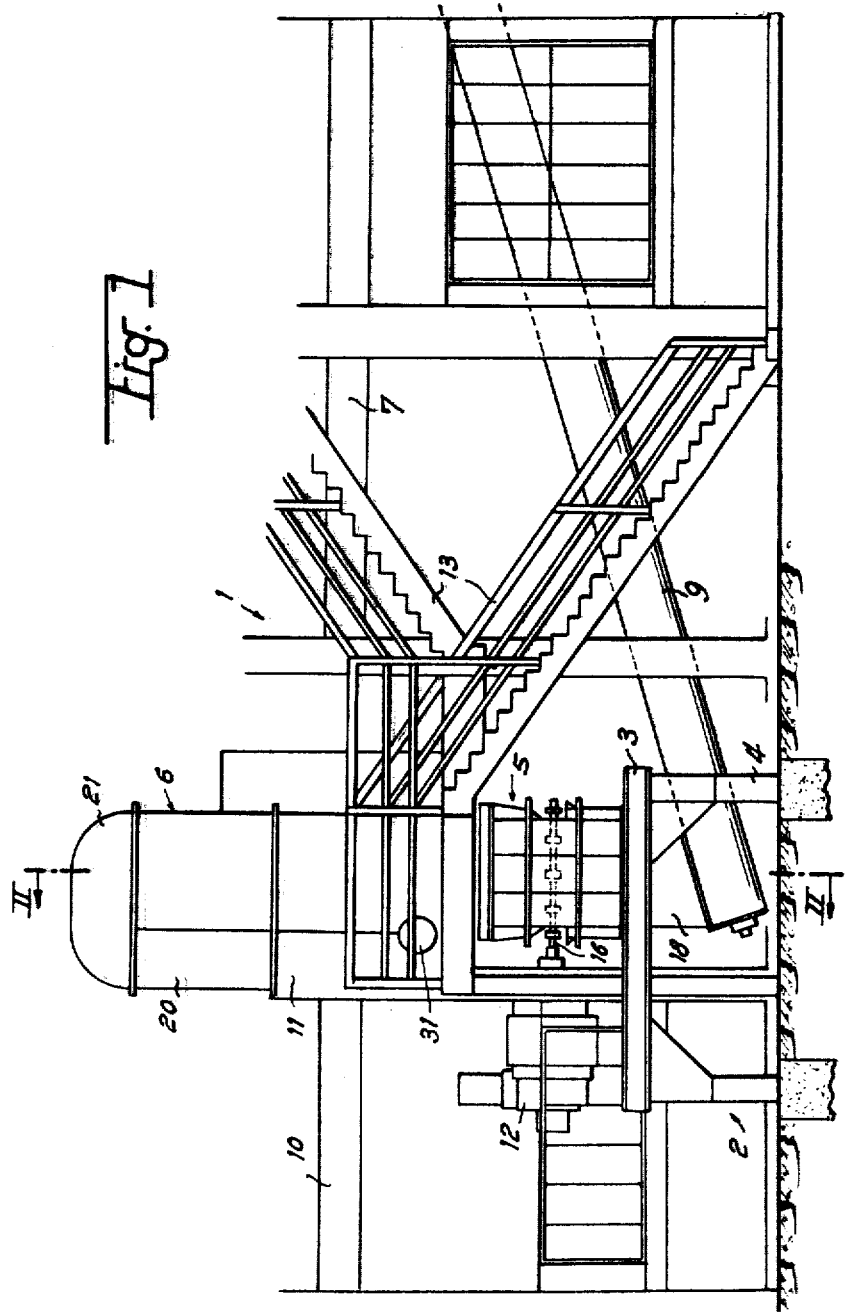

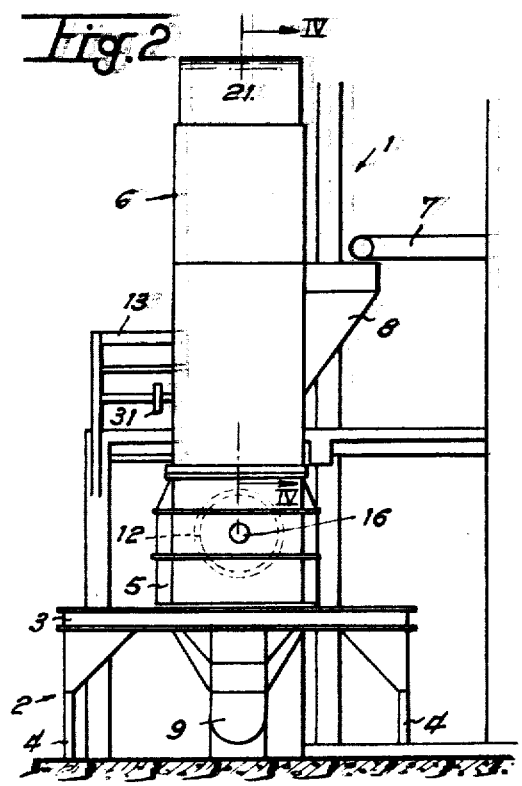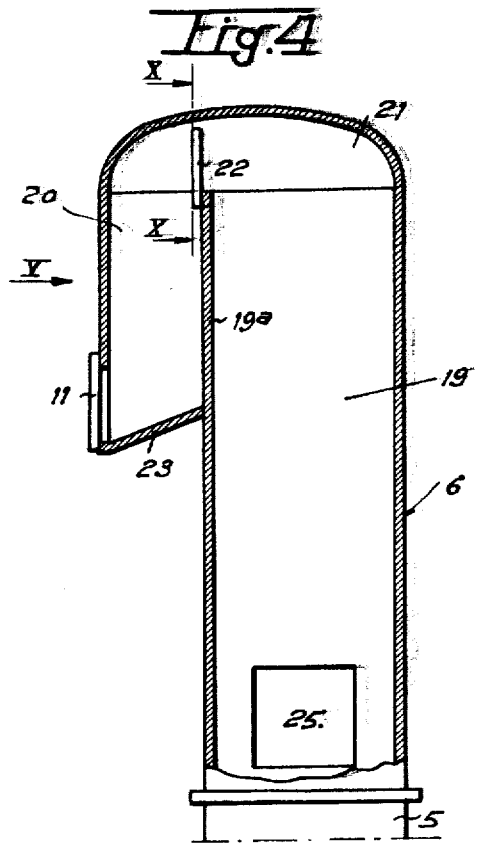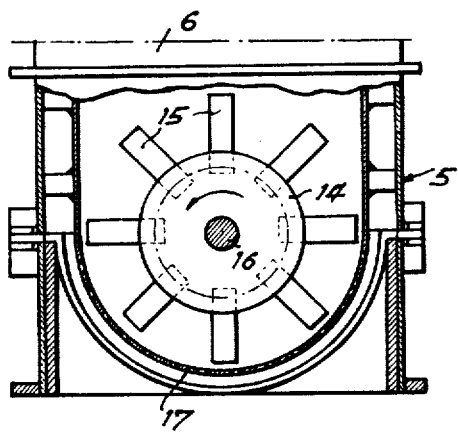

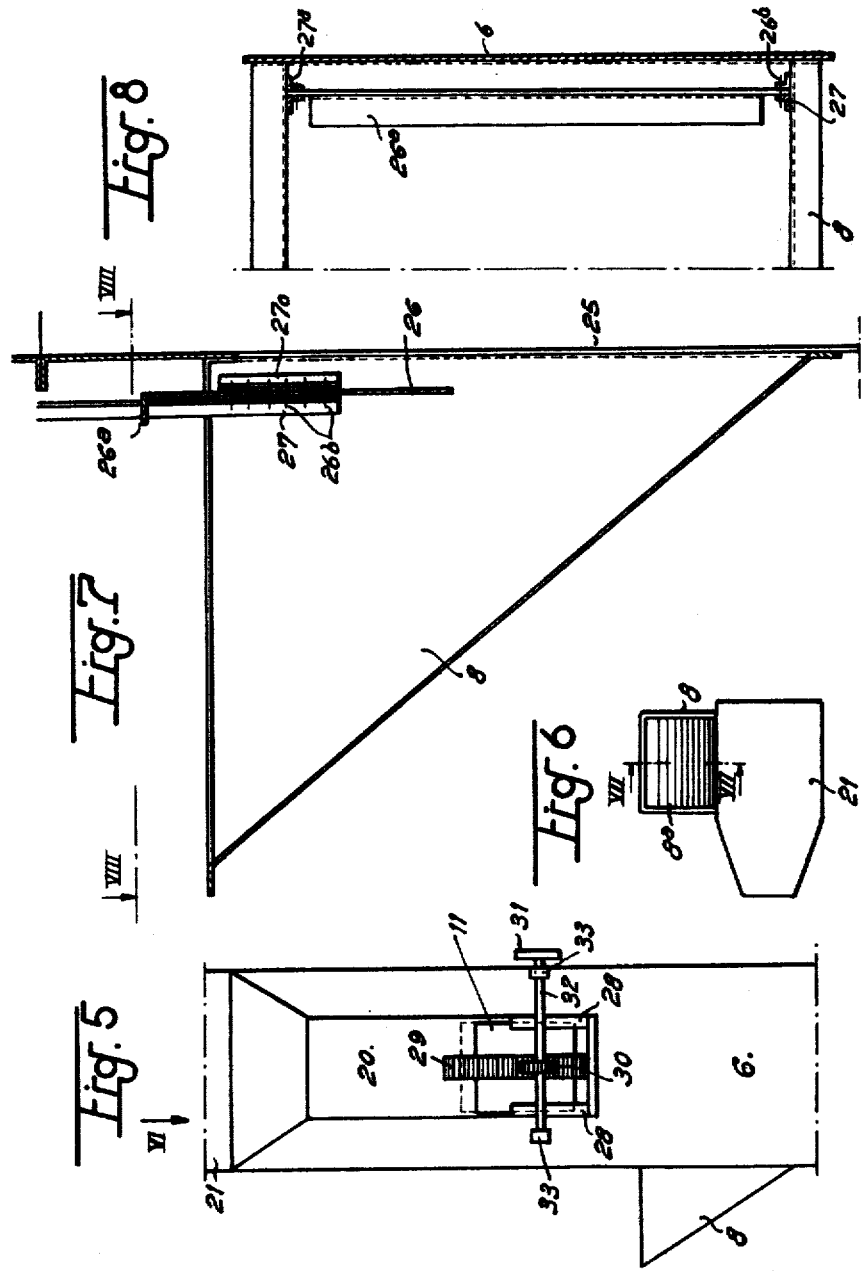

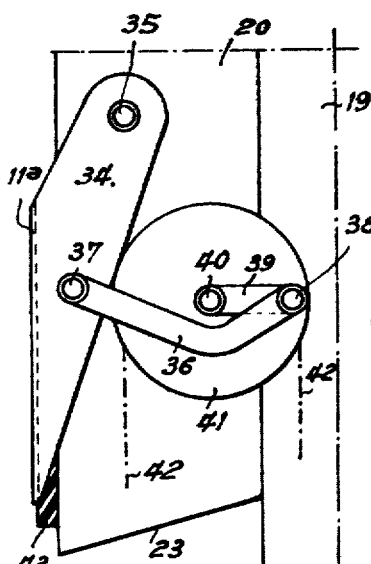
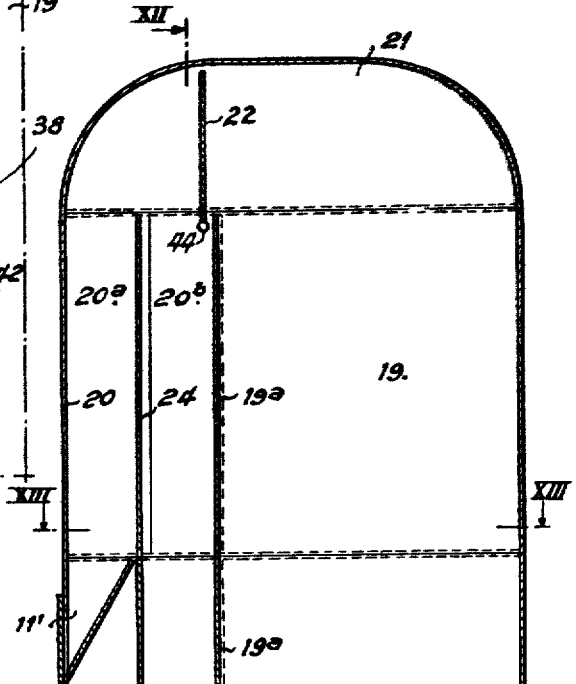
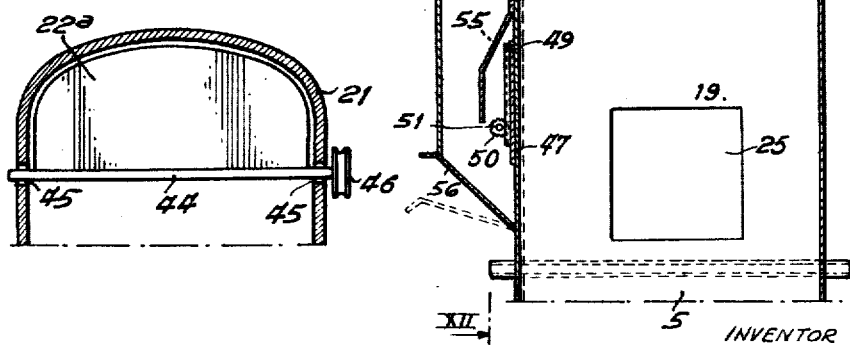

United States Patent Office 3,082,963
Patented Mar. 26, 1963

3,082,963
HAMMER GRINDER
Jean Charles Pierre Gondard, Montanglaust, France, assignor to Broyeurs Gondard, Paris, France, a corporation of France
Filed May 2, 1961, Ser. No. 107,078
Claims priority, application France May 4, 1960
7 Claims. (Cl. 241—82)

The invention relates to a hammer grinder adapted to be used mainly; but not exclusively, for the grinding of domestic refuse by applicable without modification for the grinding of very different objects and in particular products which are relatively difficult to grind, such as fodder.

Known grinders are generally provided with "traps" arranged to receive hard non-grindable bodies which might otherwise damage the hammers or the internal members of the grinder. These traps are usually separated from the grinding chamber by a trap door, the weight of which is calculated such that it will only open under the impact of a hard body.

Unfortunately, in the case of a blocking or an arrival of too much material to be ground, the heap of material acts likewise on the trap door and the latter then ejects grindable products.

The invention has as an object, the avoidance of this drawback by not including the trap door and by obtaining an evacuation of only the non-grindable objects. In addition it permits a dispersion of unusual heaps of material to be ground and their return towards the rotor, carrying the hammers, in small distributed quantities over a time long enough to facilitate greatly their grinding.

The invention is therefore concerned both with a rational method of feeding a hammer grinder over its whole upper surface and an automatic evacuation device for the non-grindable objects without the intervention of any mechanism.

A grinder according to the invention is characterised essentially by the fact that it comprises a vertical chimney of suitable, relatively large height, surmounting the tub of the grinder, one wall of the chimney communicating with the charging hopper and the upper end of the chimney being connected by means of a hood of suitable shape to a vertical trap or casing disposed adjacent to or against one face of the chimney, this casing being provided at its lower part with an evacuation trap door for the non-grindable objects.

In the attached drawings there is shown diagrammatically one embodiment of the invention and one modification.

FIGURE 1 is a general elevation of the installation;
FIGURE 2 is a section on II—II of FIGURE 1;
FIGURE 3 is a cross-section of the actual grinder;
FIGURE 4 is a vertical section with part elevation, at lines IV—IV on larger scale than FIGURE 1, of the turbulence chamber and trap of the grinder;
FIGURE 5 is a part elevation in the direction of the arrow V of FIGURE 4;
FIGURE 6 is a view from above in the direction of the arrow VI of FIGURE 5;
FIGURE 7 is a part vertical section on VII—VII of FIGURE 6 or FIGURE 13;
FIGURE 8 is a part plan seen in the direction of the arrows VIII of FIGURE 7;
FIGURE 9 is a detail on a larger scale in elevation of the control mechanism of a discharge trap door for the non-grindable products;
FIGURE 10 is a detail section on lines X—X of FIG. 4 showing one embodiment of a trap door, separating the turbulence chimney from the trap or casing of the non-grindable products;

FIGURE 11 is a section similar to FIG. 4 showing a modification of the turbulence chamber and trap;
FIGURE 12 is a vertical section on XII—XII of FIGURE 11, and
FIGURE 13 is a horizontal section on XIII—XIII of FIGURE 11.

It can be seen in FIGURES 1 and 2 that the apparatus according to the invention is installed in a building with several storeys designated in its whole by 1. A special part 2 comprising a platform 3, supported by four posts 4, supports the actual grinder 5 and a system 6, which on the one hand ensures a better distribution of the products to be ground between the various hammers of the grinder, as will be seen later, and on the other hand serves to evacuate the objects which are impossible to grind which will be called in a general manner "scrap metal" in the remainder of this description. A platform 7 is provided at which wagons or lorries loaded with products to be ground will arrive. The products to be ground are discharged into a hopper 8. A conveyer 9, commencing beneath the grinder 5, carries away the ground products. A platform 10 is provided to receive the wagons or lorries which remove the "scrap metal" leaving at 11 of the system 6. A motor 12 operates the actual grinder. Finally stairs 13 connect the various stages of the installation.

The building 1 and the structure 2, 3 are of any kind and do not form part of the invention. The actual grinder is of the hammer type and also does not itself form a part of the invention. As FIGURES 1 to 3 show, the tub (or casing) 5 of the grinder is of general parallelepipedic shape and encloses an elongated drum 14 (FIGURE 3) carrying hammers 15 and which rotates in the direction of the arrow under the action of the motor 12, the energy of which is transmitted by a shaft 16 and suitable reduction gears. Under this drum, there is a semi-circular lower wall 17, fixed to the tub 5, coaxially with the shaft 16, perforated or formed with bars and hereinafter termed "screen" through which the ground products fall at 18 to the lower part of the apparatus (FIGURE 1) and are carried away by the conveyer 9.

According to the invention, the system 6, preferably of sheet metal is formed by an assembly comprising a chimney or turbulence chamber 19 connected to the upper part of the tub 5 and a trap or casing 20 of smaller section. The chimney 19 and the casing 20 are connected at their upper part by a hood 21. A shutter 22, which will be described hereinafter, enables, as desired, the communication between the chimney and the casing to be cut-off. The lower part of the latter is preferably closed at 23; but an opening closable by a discharge trap door 11 or 11a, which will likewise be described later, is perforated in the immediate vicinity of the base 23. The casing 20 is intended to receive the "scrap metal." In the variation of FIGURES 11 and 12, the casing 20 is divided into two vertical chambers 20a and 20b by a partition 24, parallel to the partition 19a, which separates the chimney 19 from the casing 20. The respective roles of these chambers will be described in connection with the operation of the installation.

The charging hopper 8, of usual shape discharges through an opening 25 (FIGURES 4, 7 and 8) in a vertical wall of the system 6 above the grinder 5 and positioned parallel to the axis of the drum 14. The opening 25 may be closed by a trap door 26, the detail of which will be described later.

The loading trap door 26 is guided between two pairs of plates 27, 27a (one plate of each pair only being visible in FIGURE 7) welded to the side walls of the hopper 8 and serving as slides for the trap door. The plates 27 are pierced with holes, not shown, as well as the upper edge 26a of the trap door in order to be able to immobilise the latter at the desired height by means of two bolts, engageable respectively with two holes at the same height as the plates 27 and against which the flange 26a is supported. For the sake of clarity, horizontal dashes 26b indicate in FIG. 7 the possible positions of the bolts in the holes and in FIG. 8, said bolts are also shown by the dashes 26b. The holes in question are preferably at a distance of about 50 mm. (approximately 2.0 inches) to permit relatively perfect regulation of the trap door. It will be noted that this latter does not mask the whole of the opening 25, a certain space remaining free at the bottom of the latter when the trap door 26 is lowered to the maximum. The purpose of the trap door 26 is to control the rate of feeding of the material to be ground and of the air admitted into the grinder, in order to accurately control the turbulence of said air within the chimney 19 and consequently the spreading of the grindable material over the grinding drum.

The trap door 11 may be constructed and controlled in various ways. In a first embodiment, shown in FIGURES 4 and 5, the trap door 11 slides in the vertical slides 28 and its control mechanism comprises a rack 29 fast with the trap door 11, a pinion 30 meshing with this rack and a wheel 31, operating the pinion by means of a shaft 32 (FIGURE 5). The axle 32 turns in bearing 33, carried by the framework of the assembly 6. The control of the wheel 31 is effected by hand or by belt or chain, driven by a motor for that purpose. This construction is suitable especially if perfect air-tightness of the casing is not desired.

In a second embodiment, represented in FIGURE 9, the trap door 11a has a section of U shape through a horizontal plane and comprises two legs 34, located on both sides of the casing 20 and hinged at 35 to this casing. The wheel itself is operated by a set of rods. For example, a bent bar 36 is connected at one end at 37 to the trap door 11a and at the other end at 38 to a link 39 integral with the axle 40 of a wheel 41, driven, like the wheel 31, by hand or by belt or chain 42, shown in dot and dash lines, from a motor for this purpose. A joint 43 of rubber or similar material disposed on the periphery of the evacuation opening forms a tight joint with the trap door 11a in its closed position.

Preferably, in all cases, as indicated previously, there is provided in addition a shutter 22 under the hood 21, in order to separate as desired the chimney 19 from the casing 20. This shutter is preferably pivotable and integral with a pivot axle, mounted in a suitable manner in bearings carried by the assembly 6 and which is set in rotation from outside, for example, by a wheel. In FIGURE 10, the shutter is indicated by 22a, its pivot axle by 44, the bearings in the walls of the system 6 are indicated at 45 and the manoeuvring wheel, which is similar to the wheel 31, previously described, is indicated at 46.

In all cases it is advantageous to synchronise the operation of the trap door 11 or 11a and the shutter 22 so that one is closed when the other is opened. This synchronisation is very easy to realise. In the case of the trap door 11 operated through a control wheel 31 and moved simultaneously with a pivoting shutter flap 22 operated through a control wheel 46, it suffices to provide the wheel 46 with a reduction gear and to connect said gear to the wheel 31 by means of a belt or chain 57 (shown in chain-line in FIG. 1) in such a manner that the rotation of wheel 31 for fully raising (opening) the trap door 11 causes the shutter flap 22 to pivot about the shaft 44 into the closed position shown in FIGS. 1 or 10. When the shutter and the trap door are both pivoting flaps it is sufficient to turn them simultaneously by means of the two wheels 41 and 46, for example, through a belt transmission 57. Likewise, as in practice, the control of the shutter and trap door is effected by a wheel, whatever their nature, as it is possible to provide on one side a slidable flap and on the other a pivotable flap and nevertheless operate them in synchronisation by a very simple mechanism.

In the variation of FIGURES 11 to 13, the casing 20 is as indicated above divided into two vertical passages 20a and 20b. The passage 20a serves for the evacuation of the "scrap metal" and comprises as before a discharge trap door 11', whilst the passage 20b which serves for the recycling of the dust and the ground products carried along by the ascending current of air is extended as far as the bottom of the chimney 19 and leads into this through an opening capable of being closed by a trap door 47 (FIGURE 12). The trap door 47 is preferably slidable like the trap door 11 and slides in the slides 48 and is moved by a system comprising a rack 49, a pinion 50, a shaft 51 turned at 52 on the outer wall of the system 6 and a wheel 53. A suitable deflector 55 is preferably provided (FIGURES 11 and 13) above the opening in the partition 19a in order to protect the control mechanism of the trap door 47. An inspection door 56 (FIGURE 11) gives, in addition; preferably access to the lower part of the chamber 20b. As in the construction of FIGURE 4 a shutter, such as 22, may cut the communication between the chimney 19 and the assembly of passages 20a and 20b.

The operation of the installation follows clearly from the description which follows:

The products to be ground are poured into the hopper 8 and fall onto the drum 14 and the hammers 15 of the grinder 5. The ground products fall directly through the screen 17 onto the conveyer 9, which carries them away. The solid grindable products, too large to be ground at the first attempt, remain due to their weight in the grinder 5, until they are reduced to rather small pieces, which will pass through the screen 17. The large but light grindable products (for example, fodder, refuse, wood and metal chippings, meat scraps, bones, wood or plastic material waste) are raised by the combined action of centrifugal force and the violent current of air produced, as experience shows, by the sole rotation of the grinder, without it being necessary to provide a blower, and ascend the chimney 19, where they are dispersed by the current of air and by contact with the wall of the hood 21 and fall again in a shower in the tub of the grinder, which improves the distribution of these products among the various hammers. However the nongrindable objects (for example, tins or other metal scrap) are simply flattened or laminated between the hammers and the screen 17 and are projected by centrifugal force into the chimney; as indicated above, the current of air produced by the rotation of the grinder takes along with the "scrap metal," dust or light ground products. The separation is made in practice in the hood 21; the "scrap metal" is directed by inertia towards the casing 20 or, in the variation of FIGURES 11 to 13 into the chamber 20a, whilst the lighter products fall back into the chimney 19 and partly in the aforementioned variation into the chamber 20b, where they may be recycled through the trap door 47. The "scrap metal" accumulates against the bottom of the casing 20 or the chamber 20a and is evacuated periodically through the discharge trap.

If the installation operates in an intermittent manner, one proceeds with the evacuation of the "scrap metal" by opening the trap door 11, 11a or 11', when the feeding is interrupted; but if the installation must operate in a continuous manner, the products to be ground being poured practically without interruption into the hopper 8, it is necessary to provide an evacuation of the "scrap metal" without interruption of the feeding of the grinder. Now, as long as the trap door 11, 11a or 11' is closed, the pressure produced in the casing 20 or in the chamber 20a by the current of air, prevents in practice light objects, such as paper, from penetrating the casing or the chamber and thus being carried away with the non-grindable objects. (If the trap door 47 is also closed, the pressure is also exercised in the chamber 20b and there is no recycling. On the other hand, if it is open, the light products circulate both in the chimney 19 and in the passage 20a.) However, if the trap door 11, 11a or 11' is open during the rotation of the grinder, there is the risk of not only the non-grindable objects escaping; but also light objects, such as papers or dust. This undesirable evacuation may be obviated according to the invention by the operation of the shutter 22 or 22a. It is of course possible to close the shutter 22.

It must be understood that the embodiments described and shown are only by way of example and may be subjected to numerous modifications in detail without departing from the outline of the invention as defined by the following claims.

I claim:

1. In an industrial grinder comprising a vertical parallelopipedic tub having parallel end walls and parallel lateral walls, a rotary hammer-carrying elongated drum within said tub, a horizontal shaft for said drum the axis of which is parallel to said lateral walls and rotatably mounted in said end walls, a semi-cylindrical screen coaxial with said shaft and closely surrounding said drum below said horizontal shaft, and means at the lower part of the grinder, below said screen, for collecting and carrying away the ground material, a vertical parallelepipedic chimney surmounting said tub and having end and lateral walls extending respectively above the corresponding walls of the tub and substantially in the same vertical planes as said tub walls, a charging opening in a wall of said chimney parallel to said drum shaft, a charging hopper externally mounted adjacent to said opening and in communication therewith, a casing for collecting the non-grindable material, said casing being adjacent to an end wall of said chimney, a connecting hood of suitable shape mounted above both said chimney and said casing for connecting same to each other, a discharge opening at the lower part of said casing, and a discharge trap door for closing said discharge opening whilst allowing for evacuating the non-grindable material, the unit formed by said chimney and said casing being substantially air-tight except for the said openings.

2. A grinder according to claim 1, in which there is a shutter in the hood between the chimney and the casing and in which the evacuation trap door and the shutter are at least in the closed position in parallel planes and are interconnected so that when the trap door is opened, the shutter is closed and conversely.

3. A grinder according to claim 2 in which the trap door is of the sliding type.

4. A grinder according to claim 2 in which the shutter is of the pivoting type.

5. A grinder according to claim 1, in which the opening of the charging hopper in the wall of the chimney is closable partly by means of a sliding flap for the purpose of permitting regulation of the feeding and turbulence in the chimney of the products to be ground.

6. A grinder according to claim 1, in which the casing is disposed against an end wall of the chimney and is divided into two chambers by a vertical partition parallel to said end wall of the chimney, the discharge door is provided in the chamber remote from the chimney and in the external wall of the casing parallel to said partition, and a closable opening is provided in the end wall which separates the casing from the chimney for the re-cycling of the grindable products.

7. A grinder according to claim 2, in which the trap door is of the pivoting type.

References Cited in the file of this patent

UNITED STATES PATENTS

| | | |
|---|---|---|
| 244,829 | Smith | July 26, 1881 |
| 387,539 | Raymond | Aug. 7, 1888 |
| 448,516 | Gardner | Mar. 17, 1891 |
| 553,163 | Jolicard | Jan. 14, 1896 |
| 1,322,339 | Plaisted | Nov. 18, 1919 |
| 1,472,609 | Martin | Oct. 30, 1923 |
| 2,204,069 | Clement | June 11, 1940 |
| 2,233,728 | Bell | Mar. 4, 1941 |

FOREIGN PATENTS

| | | |
|---|---|---|
| 316,922 | Great Britain | Aug. 6, 1929 |

UNITED STATES PATENT OFFICE
CERTIFICATE OF CORRECTION

Patent No. 3,082,963            March 26, 1963

Jean Charles Pierre Gondard

It is hereby certified that error appears in the above numbered patent requiring correction and that the said Letters Patent should read as corrected below.

Column 1, line 22, for "blocking" read -- blockage --; line 64, for "VIII" read -- VIII-VIII --; column 3, line 53, for "22a" read -- 22 --; column 5, line 6, for "passage" read -- chamber --; line 11, strike out "or 22a"; line 12, strike out "It is of course possible to close the shutter 22."; same column 5, lines 28 and 29, for "parallelepipedic" read -- parallelopipedic --.

Signed and sealed this 5th day of November 1963.

(SEAL)
Attest:

ERNEST W. SWIDER            EDWIN L. REYNOLDS
Attesting Officer            Acting Commissioner of Patents